Figures 1, 2:
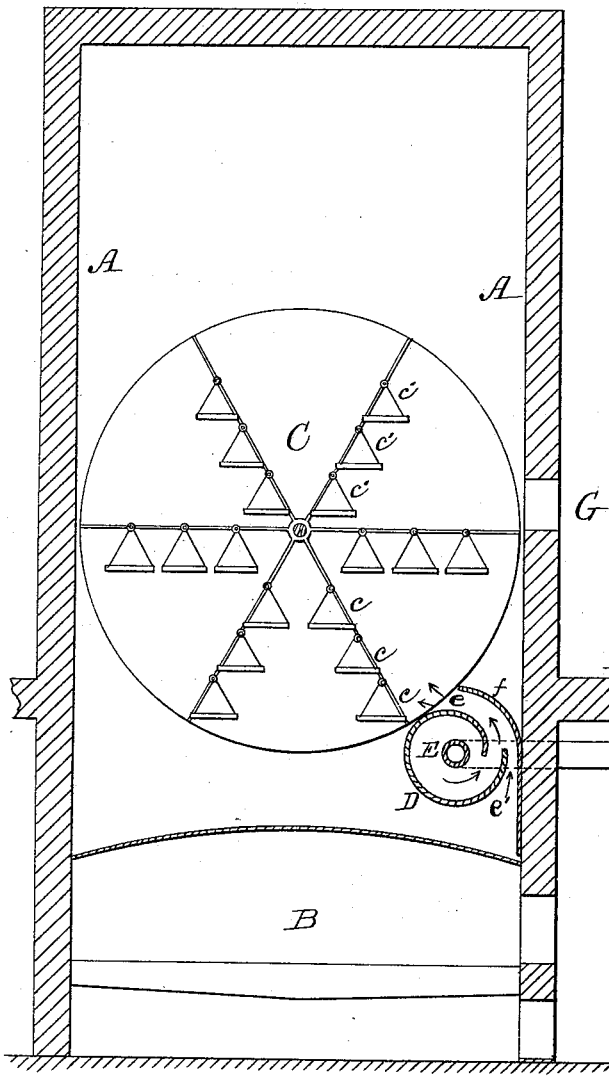

(No Model.)

D. GIROUARD.
BAKER'S OVEN.

No. 329,898. Patented Nov. 10, 1885.

Witnesses;
C. H. Arnold
James Greene

Inventor;
David Girouard
By Jas. G. Arnold
Attorney.

UNITED STATES PATENT OFFICE.

DAVID GIROUARD, OF SPENCER, MASSACHUSETTS.

BAKER'S OVEN.

SPECIFICATION forming part of Letters Patent No. 329,898, dated November 10, 1885.

Application filed April 1, 1885. Serial No. 160,886. (No model.)

*To all whom it may concern:*

Be it known that I, DAVID GIROUARD, of Spencer, in the county of Worcester, State of Massachusetts, have invented an Improvement in Bakers' Ovens, of which the following is a specification.

My invention relates to the use of steam in baking crackers and such articles as it may be used on to advantage. It is designed to equalize the body and current of steam and direct it onto the shelves or articles in the most efficient manner.

In the accompanying drawings, Figure 1 shows a central perpendicular section or elevation of an oven embodying my invention, Fig. 2 showing a plan of the pipe E and its openings in chamber D.

A A are the walls; G, the door; B, the firebox; C, the revoluble shelves, all of which may be of the usual form.

At E is the steam-pipe, extending the length of the oven and having small holes, as at Fig. 2, is surrounded by the volute chamber, D in which the currents of steam are fully blended and equalized as they issue through the passage $e$ under the deflector $f$, by which they are directed onto the shelves $c$ $c'$, the steam flowing up the passage $e$, taking some heated air from the passage $e'$ along with it, each series of shelves being in turn brought to the door G, and when filled is turned down to a position to receive the action of the steam, and in turn is moved on for the next to take its place.

Having thus fully described my invention, what I claim therein as new, and desire to patent, is—

The combination of the oven, the steam-pipe, the volute chamber, and the deflector $f$, all constructed and operating substantially as described.

In testimony whereof I hereunto set my hand this 26th day of March, A. D. 1885.

DAVID GIROUARD.

Witnesses:
    ALEXANDER BELISLE, Jr.,
    JAS. G. ARNOLD.